(12) United States Patent
Keidar et al.

(10) Patent No.: US 9,398,266 B2
(45) Date of Patent: Jul. 19, 2016

(54) OBJECT CONTENT NAVIGATION (75) Inventors: David Keidar, Rozelle (AU); Eran Bauberg, Haifa (IL)

(73) Assignee: HERNAN CARZALO, La Plata (AR)

( * ) Notice: Subject to any disclaimer, the term of this patent is extended or adjusted under 35 U.S.C. 154(b) by 1060 days.

(21) Appl. No.: 12/061,035

(22) Filed: Apr. 2, 2008

(65) Prior Publication Data

US 2009/0251537 A1 Oct. 8, 2009

(51) Int. Cl.
*H04N 7/18* (2006.01)
*G08B 13/196* (2006.01)

(52) U.S. Cl.
CPC .......... *H04N 7/181* (2013.01); *G08B 13/19645* (2013.01); *G08B 13/19689* (2013.01)

(58) Field of Classification Search
CPC ............. H04N 7/181; G08B 13/19645; G08B 13/19689
USPC .......................................................... 348/143
See application file for complete search history.

(56) References Cited

U.S. PATENT DOCUMENTS

| | | | | |
|---|---|---|---|---|
| 6,437,819 | B1 * | 8/2002 | Loveland | 348/143 |
| 7,259,778 | B2 * | 8/2007 | Arpa et al. | 348/139 |
| 7,720,257 | B2 * | 5/2010 | Morellas et al. | 382/103 |
| 2002/0168084 | A1 * | 11/2002 | Trajkovic et al. | 382/100 |
| 2004/0100563 | A1 * | 5/2004 | Sablak et al. | 348/211.4 |
| 2005/0265582 | A1 * | 12/2005 | Buehler et al. | 382/103 |
| 2006/0197839 | A1 * | 9/2006 | Senior et al. | 348/169 |
| 2006/0222209 | A1 * | 10/2006 | Zhang et al. | 382/107 |
| 2006/0268108 | A1 * | 11/2006 | Abraham | 348/143 |
| 2006/0274828 | A1 * | 12/2006 | Siemens et al. | 375/240.01 |
| 2006/0285723 | A1 * | 12/2006 | Morellas et al. | 382/103 |
| 2007/0052807 | A1 * | 3/2007 | Zhou et al. | 348/159 |
| 2007/0146484 | A1 * | 6/2007 | Horton et al. | 348/159 |
| 2009/0009599 | A1 * | 1/2009 | Lee | 348/143 |
| 2009/0046153 | A1 * | 2/2009 | Chen et al. | 348/159 |
| 2009/0079831 | A1 * | 3/2009 | Sethuraman et al. | 348/153 |
| 2010/0111377 | A1 * | 5/2010 | Monroe | 382/118 |
| 2013/0222600 | A1 * | 8/2013 | Donovan et al. | 348/159 |

FOREIGN PATENT DOCUMENTS

WO WO2008001345 1/2008

OTHER PUBLICATIONS

International Search Report mailed Jul. 24, 2009 for PCT/IL2009/000373 filed Apr. 5, 2009.
Written Opinion of the International Searching Authority mailed Jul. 24, 2009 for PCT/IL2009/000373 filed Apr. 5, 2009.

\* cited by examiner

*Primary Examiner* — June Sison
*Assistant Examiner* — Steven Nguyen
(74) *Attorney, Agent, or Firm* — Paul D. Bianco; Fleit Gibbons Gutman Bongini & Bianco PL (57) ABSTRACT

A surveillance system for monitoring a selected object that comprises a multiplicity of video cameras, a software application and at least one computerized medium. The computerized medium enables operating the application and the application is operatively associated with the cameras, which are installed in different locations in a surveillance area. The system allows a user to select at least one object such as an image or an area that is filmed by at least one of said cameras and monitor said object by automatically operating cameras that are associated with the object's coordinates' location, where the associated camera enables filming the selected object.

8 Claims, 7 Drawing Sheets

OBJECT CONTENT NAVIGATION

FIELD OF THE INVENTION

The present invention relates generally to the field of surveillance monitoring systems and more particularly, to closed circuit television surveillance systems based on video streams arriving from a multiplicity of video cameras.

BACKGROUND OF THE INVENTION

Monitoring and surveillance systems often require a multiplicity of cameras showing a user that supervises a predefine location, facility, property or any other predefined area (e.g. a supervisor, a guard etc.) video streams arriving from the cameras over a multiplicity of monitors (e.g. screens and/or computers). To supervise over an area in which a multiplicity of cameras are installed in different locations over the area, the user has to simultaneously observe a number of screens (or a number of windows in a single screen).

An patent application number WO2008001345, which is incorporated herein by reference, provides a system for monitoring a closed circuit television center using enhanced graphic interface, wherein the graphic interface enables an intuitive control over multiple video streams located on a two dimensional map according to their relative physical position. Layout of icons of the cameras providing the video streams are shown on the two-dimensional map in proportion to the real physical location of the cameras in the area that is being monitored by the system. The user can use the graphical interface to shift from one scale of the map to another scale whereby the display can shift from viewing camera icons at their proportional location to windows showing the actual video streams filmed by the cameras.

To monitor a single moving figure or object image of (e.g. a person or a vehicle) that is being filmed in the area the user usually has to locate the specific camera(s) located at the area and shift to the associated camera in order to view the image or object of his/her desire. This may turn an extremely cumbersome task requiring the user to juggle between the cameras and guessing the location of a moving image.

The navigation process by which the user can navigate between cameras is usually carried out by guessing which screen or window-screen belongs to which location, which is often far from being intuitively friendly to the user.

BRIEF DESCRIPTIONS OF THE DRAWINGS

The subject matter regarded as the invention will become more clearly understood in light of the ensuing description of embodiments herein, given by way of example and for purposes of illustrative discussion of the present invention only, with reference to the accompanying drawings, wherein.

The drawings together with the description make apparent to those skilled in the art how the invention may be embodied in practice.

DETAILED DESCRIPTIONS OF SOME EMBODIMENTS OF THE INVENTION

An embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

While the description below contains many specifications, these should not be construed as limitations on the scope of the invention, but rather as exemplifications of the preferred embodiments. Those skilled in the art will envision other possible variations that are within its scope. Accordingly, the scope of the invention should be determined not by the embodiment illustrated, but by the appended claims and their legal equivalents.

Reference in the specification to "one embodiment", "an embodiment", "some embodiments" or "other embodiments" means that a particular feature, structure, or characteristic described in connection with the embodiments is included in at least one embodiments, but not necessarily all embodiments, of the inventions. It is understood that the phraseology and terminology employed herein is not to be construed as limiting and are for descriptive purpose only.

The principles and uses of the teachings of the present invention may be better understood with reference to the accompanying description, figures and examples. It is to be understood that the details set forth herein do not construe a limitation to an application of the invention. Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, or integers or groups thereof and that the terms are to be construed as specifying components, features, steps or integers. The phrase "consisting essentially of", and grammatical variants thereof, when used herein is not to be construed as excluding additional components, steps, features, integers or groups thereof but rather that the additional features, integers, steps, components or groups thereof do not materially alter the basic and novel characteristics of the claimed composition, device or method.

If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks. The term "method" refers to manners, means, techniques and procedures for accomplishing a given task including, but not limited to, those manners, means, techniques and procedures either known to, or readily developed from known manners, means, techniques and procedures by practitioners of the art to which the invention belongs. The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention can be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

The present invention, in some embodiments thereof, discloses a surveillance system 1000 and a method for monitoring at least one surveillance-target 99 may be a real person, people, article such as a vehicle etc. using a multiplicity of surveillance cameras 10 producing real time video streams. The system 1000 may be used to navigate through a predefined surveillance area 2000 and locations 200 inside that surveillance area 2000, to follow and monitor the surveillance-target 99, filmed by the cameras 10 of the surveillance system 1000, in an intuitive manner allowing a user (e.g. an authorized user such as an operator, a supervisor, a guard or any other type of user as known in the art) to quickly and/or automatically shift from one camera 10 to another in order to follow the moving surveillance-target 99.

Figure 1:
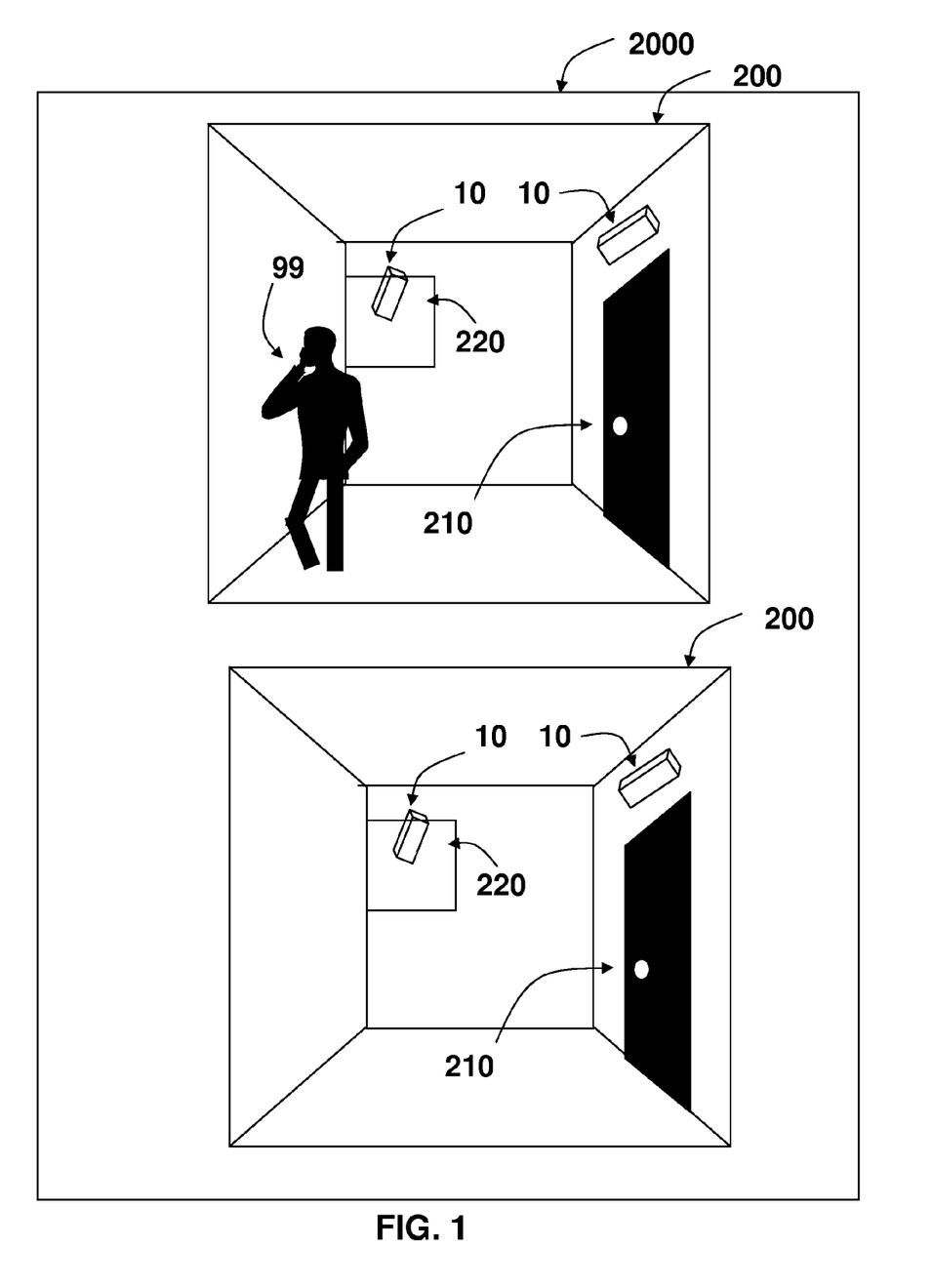
FIG. 1 is a schematic illustration of cameras-installation layout over a location in a predefined surveillance area of the image content navigation system, according to some embodiments of the invention.

FIG. 1 schematically illustrates a layout of cameras 10 in a location 200, which is one part of the surveillance area 2000. For example, the surveillance area 2000, which the system 1000 may monitor, may be a building with many rooms and/or apartments where each room or apartment may be defined as a location 200. In the illustrative example of FIG. 1, the location 200 is a room with a window 220 and a door 210 where one camera 10 has a filming field of view that is in the area of the window 220 and another camera 10 has a filming field of view that is in the area of the door 10. The surveillance-target 99 is shown in the location 200, where at least two cameras 10 (according to this exemplary drawing) can film the surveillance-target 99.

Figure 2:
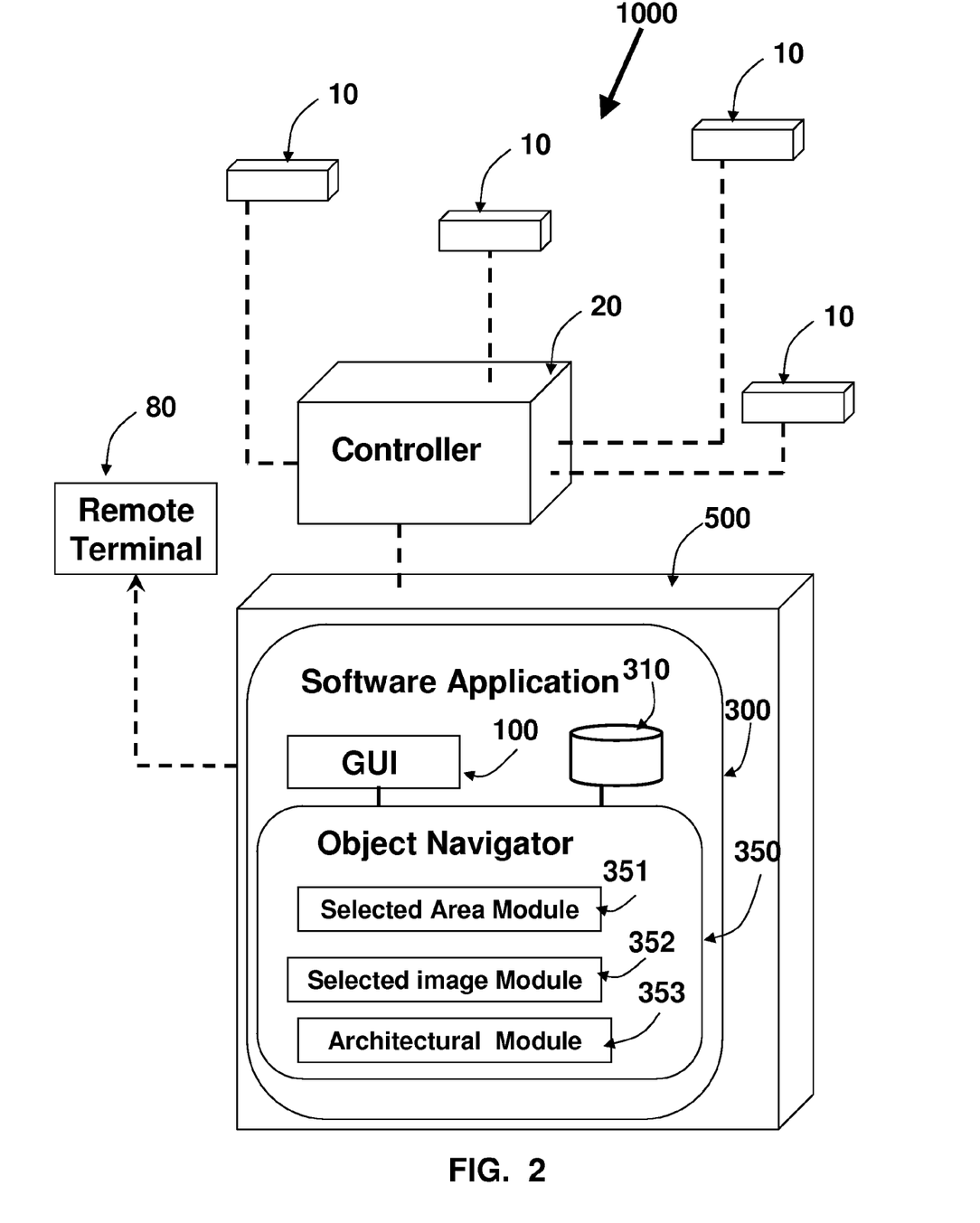
FIG. 2 is a schematic illustration of a surveillance system, according to some embodiments of the invention.

According to some embodiments of the invention, as illustrated in FIG. 2, the surveillance system 1000 may comprise:

a multiplicity of video cameras 10 (e.g. digital cameras 10 enabling to transmit online video streams as digital data);

a software application 300;

and at least one computerized medium 500 (e.g. a server-computer, a laptop or any other computerized machine that can digitally execute programs, transmit, receive and analyze data—as known in the art); and at least one controller 20 which is a hardware unit.

According to some embodiments of the invention, the computerized medium 500 may enable operating said application 300 and receiving and transmitting data from and to the cameras 10 through the controller 20. The application 300 may be operatively associated with the cameras 10 through the controller 20 and the computerized medium 500, enabling to operate and control the cameras 10 and receive cameras' 10 operative commands transmitted by the application 300 and the computerized medium 500.

Alternatively, the cameras 10 may enable transmitting data and receiving operational commands directly from the computerized medium 500 (through any kind of communication network known in the art).

Each camera 10 of the system 1000 may be associated with locating areas in video-image-displays (the display of the cameras' 10 video streams) in the computerized medium 500 and/or a remote terminal 80, as illustrated in FIG. 2. For example, the coordinates of the video-image-display in the area that shows the door 210 where this area may be associated as a hyperlink with one camera 10 that physically located at the inner side of the room 200 and with another camera that is physically located at the outer side of the room 200. When the user is viewing the video-image-display of the inner room and marks (e.g. clicks) at least a part of the area that displays the door 120, the system 1000 may automatically shift to the first camera 10 (showing its video stream) associated with this area and to the second camera 10 (showing its video stream) associated with this area.

To associate cameras with areas in the video-image-displays, the system 1000 may comprise predefined hyperlinks, associating each camera 10 of the system 1000 with coordinates of areas related video-image-displays.

The system 1000 may allow the user to select at least one virtual-object 50 that is filmed by at least one of the cameras 10 and monitor this selected virtual-object 50 by automatically operating and displaying video streams of an associated camera 10 (that is associated with the selected virtual-object's 50 area in the video-image-display of the video stream).

The virtual-object 50 may be an area comprising the image of the real surveillance-target 99 or the image of the surveillance-target 99 as shown in the video-image-display displaying online video streams that comprise the image of the surveillance-target 99.

According to some embodiments of the invention, the application 300 may comprise a graphical user interface 100, a database 310 and an object navigator 350, as illustrated in FIG. 2.

The graphical user interface 100 may allow the user to view the video-image-display of at least one camera 10 and to graphically select a virtual-object 50.

The database 310 may store cameras' 10 installation-locations 200 and enable associating the cameras 10 with the coordinates-location areas in the video-image-display of the camera 10 allowing creating the hyperlinks between the virtual-object 50 selected by the user and the associated camera 10 that allows the user to view the virtual-object 50 by identifying the coordinates of the objects 50 in the image-display.

The navigator 350 may enable processing the data of the video streams arriving from the cameras 10 according to a selected object's 50 location 200.

According to some embodiments of the invention, as illustrated in FIG. 2, the object navigator 350 may comprise a selected area module 351 and a selected image module 352. The selected area module 351 allows monitoring an virtual-object 50, which is an area in the video image that has been graphically selected by the user. The selected image module 352 allows monitoring a moving image virtual-object 50 (e.g. a moving person that is filmed by the system's 1000 cameras 10) by selecting of an image as an virtual-object 50.

According to some embodiments of the invention, the application 300 may enable a user to view recorded video streams filmed by at least some of the cameras 10 of the system 1000.

The system 1000 may be used to view video-image-displays that are either filmed online in real time or video-image-displays of offline recorded streams that were filmed by the system's 1000 cameras in the past.

According to some embodiments of the invention, the object navigator 350 may additionally comprise an architectural module 353, as illustrated in FIG. 2. The architectural module 353 may comprise an architectural plan 2100 of the surveillance area 2000 with at least some of its locations 200.

Figure 3:
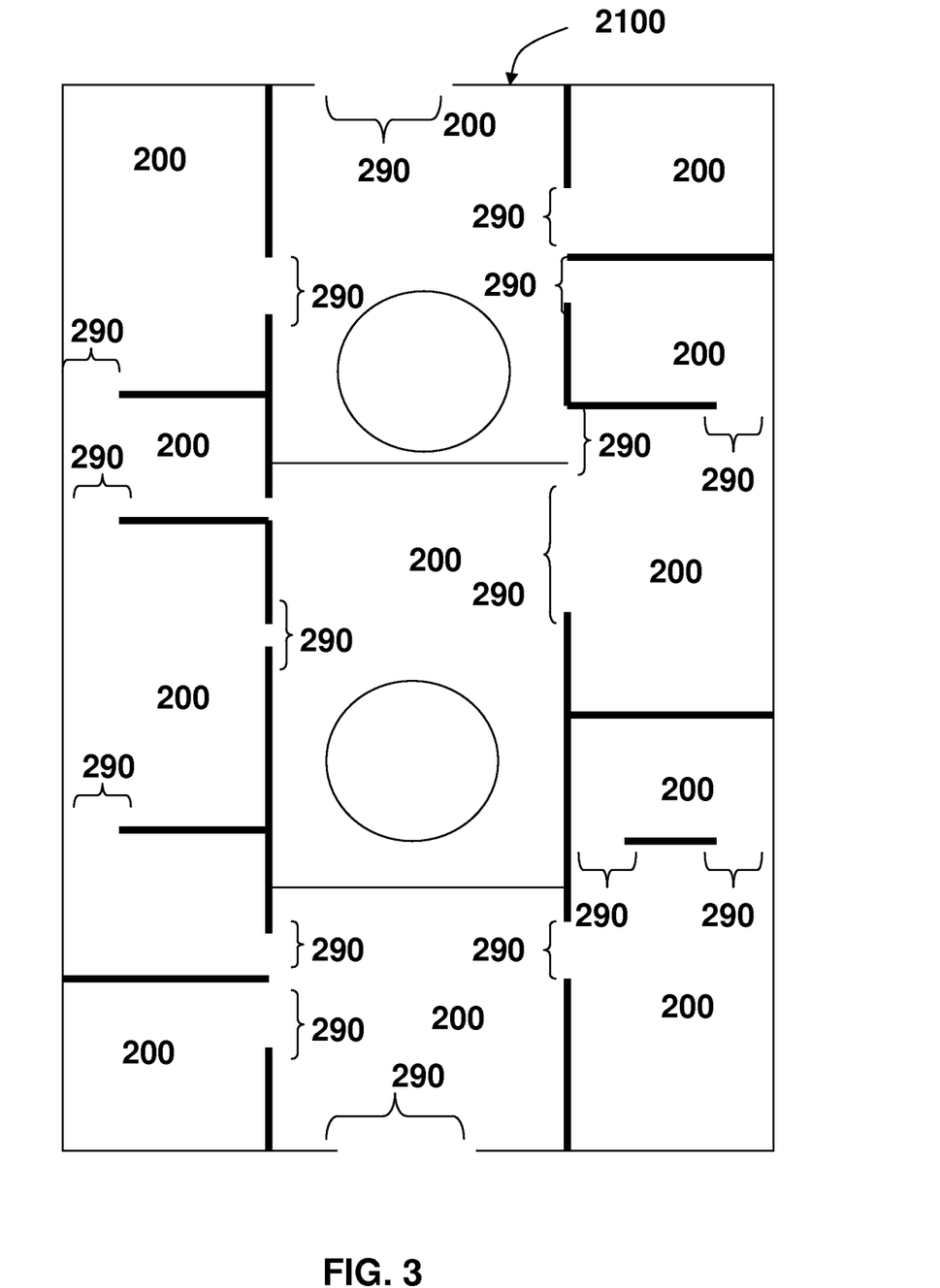
FIG. 3 is a schematic illustration of an architectural plan of a surveillance area, according to some embodiments of the invention.

FIG. 3 is a schematic illustration of an architectural plan 2100 of a surveillance area 2000, according to some embodiments of the invention.

According to these embodiments, the architectural plan 2100 may comprise a drawing of the locations 200 of the surveillance area 2000 and the location of access points 290 such as egresses enabling access to each location 200.

According to some embodiments of the invention, the architectural module 353 may enable linking the associated camera(s) 10 that is (are) relevant to the selected virtual-object 50 by using an architectural plan 2100 of the surveillance area 2000.

FIG. 3 schematically illustrates an architectural plan 2100 of a surveillance area 2000, according to some embodiments of the invention. The architectural plan 2100 may depict at least some of the locations 200 of the surveillance area 2000 and access points 290 enabling access to these locations 200. The architectural module 353 may enable linking of at least one associated camera 10 with the virtual-object 50 by using the architectural plan 2100 of the surveillance area 2000; the architectural module 353 may enables identifying of the camera 10 that is associated with the selected virtual-object 50 by identifying the access point(s) 290 in the virtual-object 50 and linking the identified access point(s) 290 with their associated camera(s) 10.

For example, if the user has selected an area as the virtual-object 50 where a door access point 290 is predefined in the architectural module 353 according to the architectural plan 2100, the camera 10 in the next location 200 may be automatically associated with that access point 290 and linked as the camera 10 from which filmed video streams will be displayed as video-image-displays.

According to some embodiments of the invention, the each access point 290 may be associated with at least one camera 10 where the association may be stored in the database 310.

Additionally or alternatively, the GUI 100 may comprise retrieving options allowing the user to select the specific cameras 10 or locations 200 filmed in selected time-intervals in order to view specific past-filmed video streams and locations 200. This may enable users to follow an object 50 that has been in the surveillance area 2000 retrospectively.

According to some embodiments of the invention, the tracking module 360 may enable a user to retrieve recoded video streams from a predefined past time-interval, select a virtual-object 50, where the system 1000 allows viewing the video-image-displays corresponding to the probable passage-tracks 250 calculated by the tracking module 360.

Figure 4:
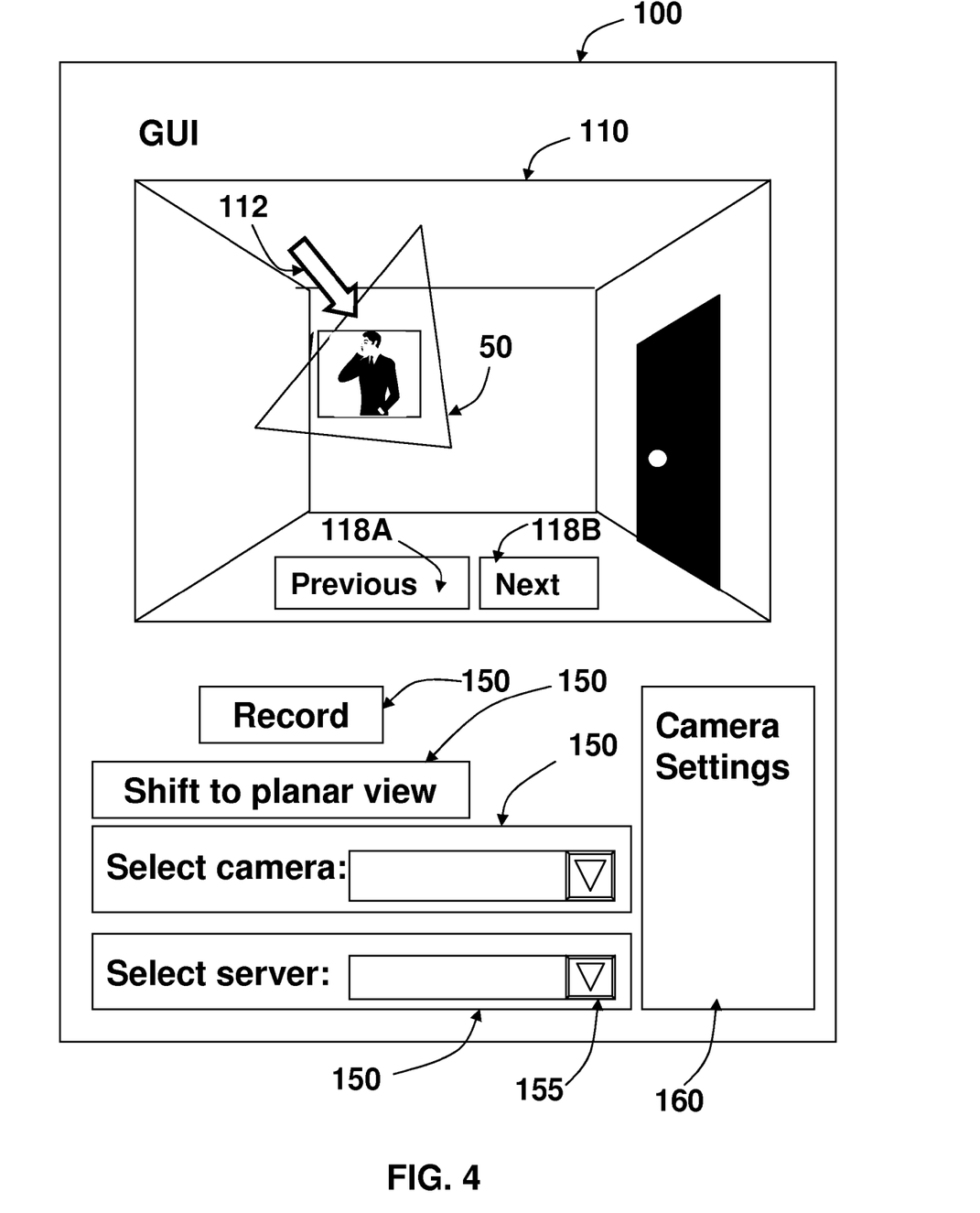
FIG. 4 is a schematic illustration of a graphical user interface of the surveillance system, according to some embodiments of the invention.
Figure 5:
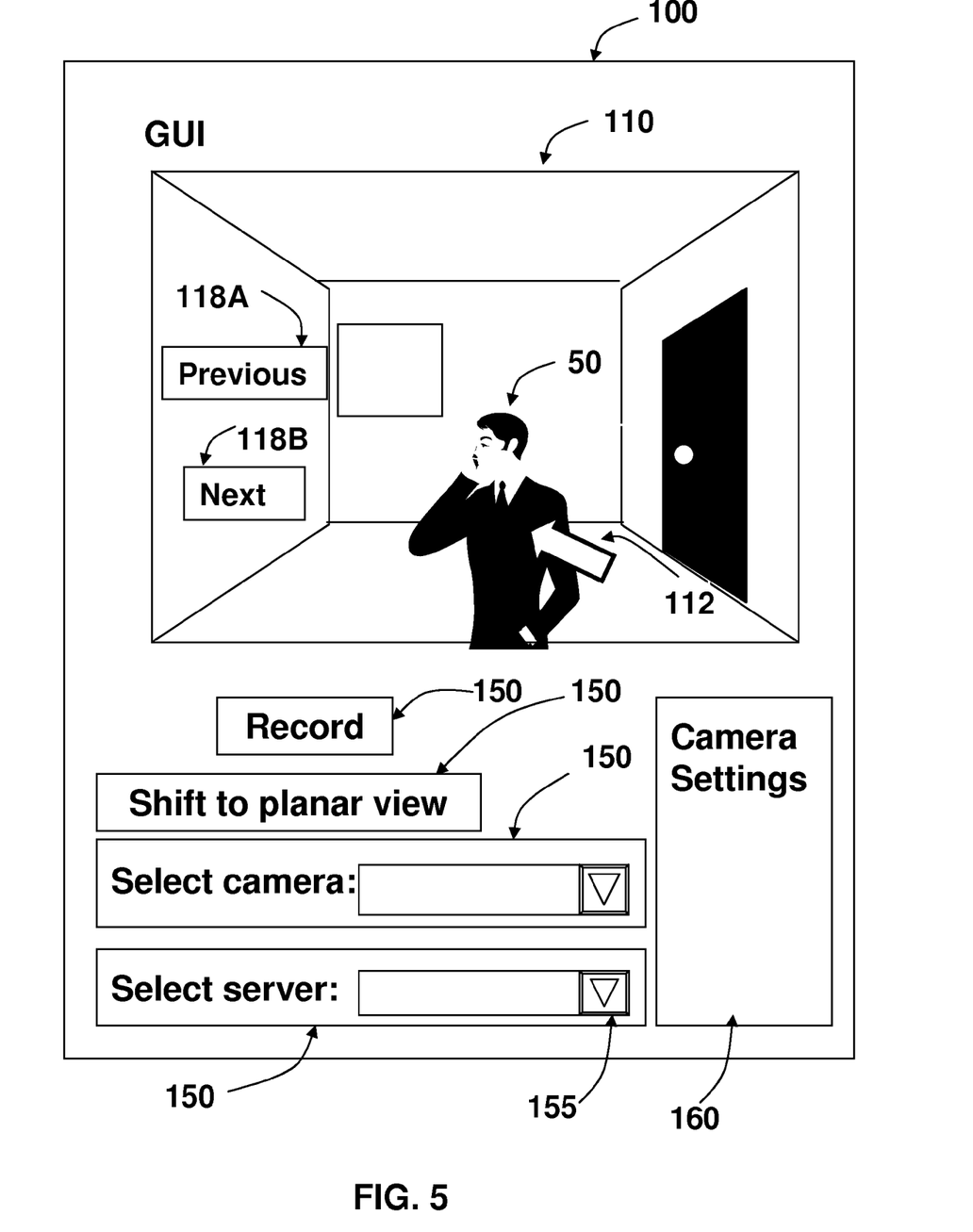
FIG. 5 is a schematic illustration of a graphical user interface of the surveillance system, according to other embodiments of the invention.

According to some embodiments of the invention, as illustrated in FIG. 4 and FIG. 5, the graphical user interface 100 may comprises:

at least one display window 110 enabling a user to view the video streams that are filmed by the system's 1000 cameras 10 as a video image display where each produced video streamed that arrives from the currently associated camera 10 is viewed through the display window 110; and at least one selecting tool 112 (e.g. an arrow or any other movable icon that can be moved across the screen, where upon moving and clicking a mouse of a computer (medium 500) the area can be graphically defined), where this tool 112 enables the user to graphically select and define an virtual-object 50 from said display unit 110.

The graphical user interface 100 may allow the user to navigate through the locations 200 of the surveillance area 2000 to monitor the virtual-object 50 by selecting the virtual-object 50, using the selecting tool 112, and viewing the selected virtual-object 50 through the display window 110.

FIG. 4 schematically illustrates a graphical user interface 100 allowing navigation through a selected area, which is the virtual-object 50, according to some embodiments of the invention. The graphical user interface 100 may allow the user to graphically select an area as the virtual-object 50 comprising the image of the surveillance-target 99 by, for example, graphically defining the coordinates of the area (e.g. by drawing a polygon to define the area), using the selecting tool 112, where the application 300 identifies the camera 10 that is associated (hyper-linked) to the coordinates defining the selected area that is defined as the virtual-object 50.

FIG. 5 schematically illustrates a graphical user interface 100 allowing navigation through selected moving image as the virtual-object 50, which is the image of the surveillance-target 99. The graphical user interface 100 may allow the user to graphically select a virtual-object 50 by, for example, graphically marking or pointing the image of the surveillance-target 99 (e.g. a person or a vehicle), using the selecting tool 112. The application 100 may identify the virtual-object 50 in the video-image-display by, for instance, identifying the moving elements in the image in relation to the coordinates of the marker—selecting tool 112. The application 300 may identify the camera 10 that is associated (hyper-linked) to the coordinates defining the positioning of the virtual-object 50 (e.g. an article or a human image) at each moment or each predefined time-interval. To identify the virtual-object 50 once it is marked, the application 300 selected image module 352 may comprise algorithms enabling to identify the coordinates of the object (and therefore the associated camera 10) at any given moment/time-interval.

According to some embodiments of the invention, as illustrated in FIG. 4 and FIG. 5, the graphical user interface 100 further comprises activators 150, which are areas in said graphical user interface 100 that allow the user to define features of display, record video streams data and save settings. The interface 100 may also comprise other links 160 enabling, for example, to select cameras 10 and define cameras 10 settings. Some of the activators 150 may allow the user to select options out of predefined lists, using, for example, scrollbars 155.

According to some embodiments of the invention, one of the activators 150 may be a "Shift to planar view" button or link, enabling the user to view a map of the surveillance area 2000 or at least one of its locations 200 with icons showing the cameras 10 and/or video-images-display of the video streams located along the map in locations that are proportional to the cameras' 10 real physical locations. The map and cameras' 50 icons. This viewing technique may be the one described in patent application number WO2008001345, which is incorporated by reference to this application (see Background).

Alternatively, the planar view may enable the user to see all the locations 200 of the surveillance area 2000 by dividing the display window 110 into several windows showing a number of locations 200 video-images-display simultaneously to help the user to find and select the virtual-object 50 according to the surveillance-target 99 he/she wishes to monitor.

Additionally, as illustrated in FIG. 4 and FIG. 5, the graphical user interface 100 may also comprise a "Previous" button 118A and a "Next" button 118B allowing the user to go back and/or forth to view previous and last video-images-displays.

Figure 6:
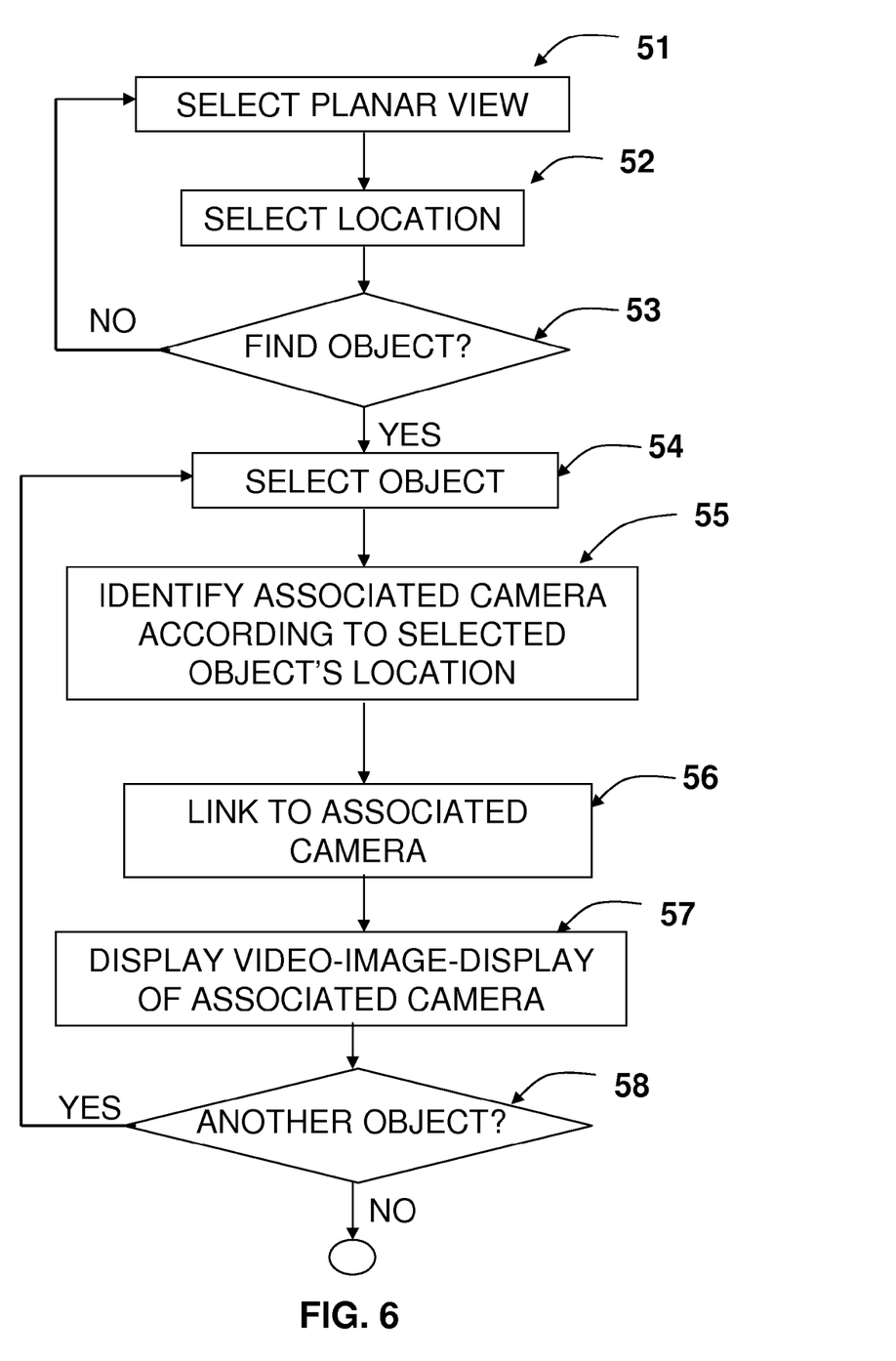
FIG. 6 is a flowchart schematically illustrating a process for object monitoring, according to some embodiments of the invention.

FIG. 6 is a flowchart schematically illustrating a process for monitoring of surveillance-targets 99, according to some embodiments of the invention. This process may comprise:
  selecting the planar view 51 in the user interface's 100 display window 110, where the user may view more than one of the surveillance area's 2000 locations 200;
  selecting a location 52;
  once the user finds an object 53 he/she wishes to monitor;
  selecting an object 54, where the user graphically selects the virtual-object 50 from the video-image-display in the display window 110;
  identifying at least one camera 10 that is associated with the area in the video-image-display 55 of the selected virtual-object 50 that is able to film said selected virtual-object 50 according to the coordinates defining the location of the selected virtual-object 50;
  linking the area of the selected object 56 in the video-image-display to the identified associated camera 50 (e.g. by creating a hyperlink between the area and the associated camera 10;
  displaying the video-image-display of the video streams arriving from the associated camera 57.

The user may choose to select another different object 57 and repeat steps 51-57 or steps 54-57.

Figure 7:
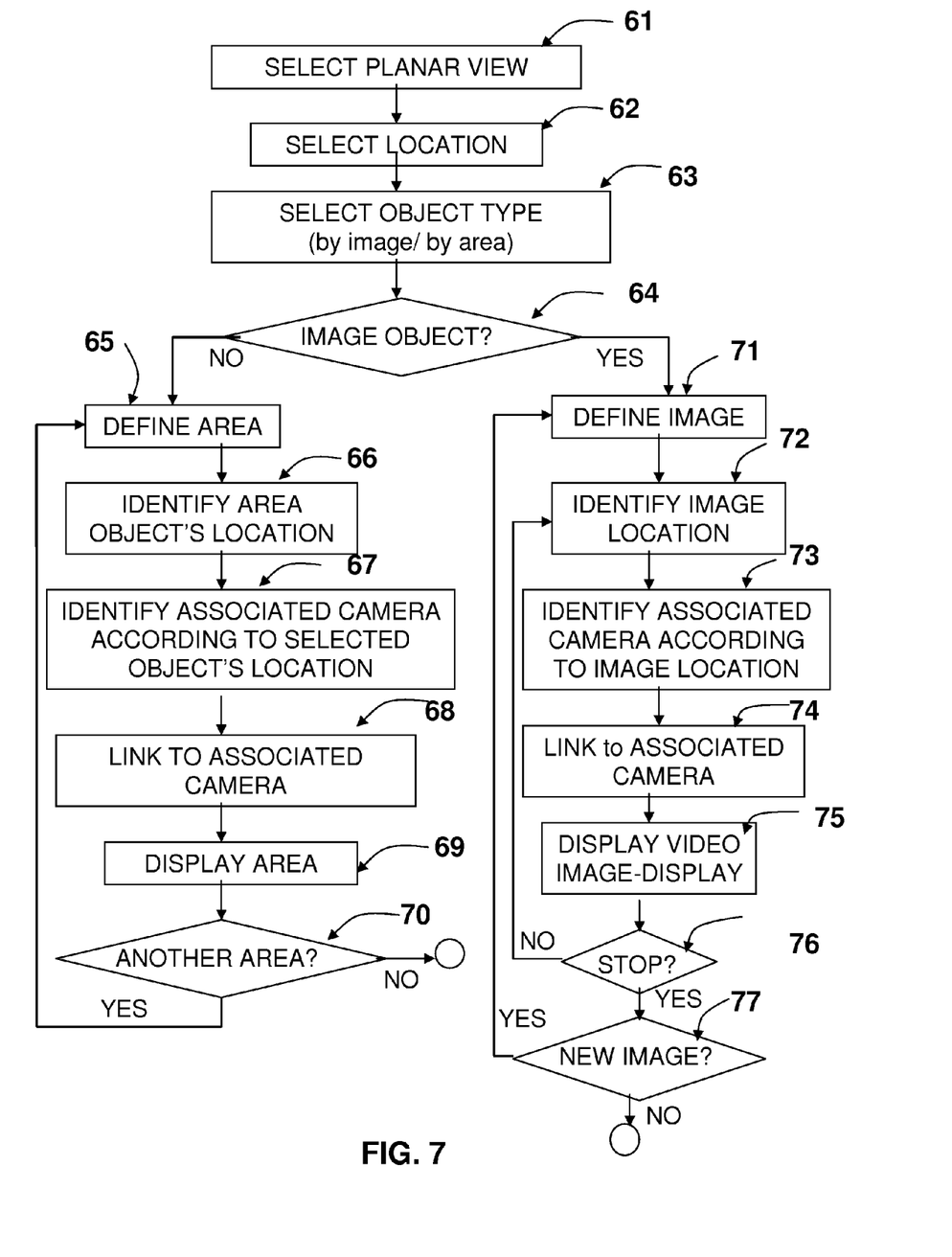
FIG. 7 is a flowchart schematically illustrating a process for object monitoring with two optional types of objects, according to some embodiments of the invention.

FIG. 7 is a flowchart schematically illustrating a process for object monitoring with two optional types of objects, according to some embodiments of the invention.
  selecting the planar view 61 in the user interface's 100 display window 110, where the user may view more than one of the surveillance area's 2000 locations 200;
  selecting a location 62;
  selecting an object-type 63 where the user may select the type of the virtual-object 50 he/she wishes to monitor (e.g. a moving image such as a person image or an area virtual-object 50 defining the area in the video-image-display he/she wishes to view;
  selecting an object 64, where the user graphically selects the virtual-object 50 from the video-image-display in the display window 110 according to the selected object type (e.g. a moving image virtual-object 50 may be selected by marking the virtual-object 50 with the selecting tool 112 and double clicking the mouse where the area virtual-object 50 may be selected by defining an area in the display window 110 that comprises an image 10 the user wishes to monitor, e.g. by using the selecting tool 112 to define a closed shape such as a polygon comprising the virtual-object 50).

As illustrated in FIG. 7, if the user selects the area 64 as a virtual-object 50, the process may comprise:
  enabling a user to define the area 65 (e.g. by marking or coloring a closed shape such as a polygon or a circle that comprises an image or article the user wishes to view);
  identifying the area object's location 66 by, for example, identifying the coordinates encircling the shape defining the area;
  identifying the associated camera 10 which is associated with the identified location 67;
  linking the area or the location of the area object 68 with the associated camera 10;
  displaying the video-image-display of the associated camera 69 in the display window 110.

The user may select another area 70, for example, to monitor a moving image by repeatedly selecting the areas in which he/she spots the image.

As illustrated in FIG. 7, if the user selects the moving image 64 as an virtual-object 50, the process may comprise:
  defining the image 71 (e.g. by selecting it or by marking the contours of the image's figure);
  identifying the image's location 72 by, for example, identifying the coordinates in which the object's contours are (or were at the moment the virtual-object 50 has been selected);
  identifying the associated camera 10 which is associated with the identified location 73;
  linking the area or the location of the image virtual-object 50 with the associated camera 74;
  displaying the video-image-display of the associated camera 75 in the display window 110.

Since the image can move steps 72-75 may automatically repeat according to a predefined program (algorithm) in which the application's 300 selected image module 352 may enable to identify the image virtual-object 50 and its changing location therefore its changing associated cameras 10 (e.g. by image processing).

Alternatively or additionally, to detect the location of the moving or non moving virtual-object 50 and therefore the associated camera 10, the system 1000 may additionally comprise movement-sensors enabling to sense movements of selected virtual-objects 50 and therefore transmit the coordinates of the physical location of the virtual-object 50 in the location 200 of the surveillance area 2000, where the application 300 may enable translating the coordinates of the object's 50 physical location into coordinates of the object's 50 location in the video-image-display.

According to some embodiments of the invention, to shift smoothly from one camera 10 to another (either when using the moving image type and its related selected image module 352 or the area virtual-object 50 and its related selected area module 351) the application 300 (and its modules e.g. 351, 352) may enable storing (recording) and processing of the data video streams arriving from the of the cameras 10 to allow playback of recorded filmed video streams to reach the correct moment in time in which one camera's 10 stream is shifted to another's.

While the invention has been described with respect to a limited number of embodiments, these should not be construed as limitations on the scope of the invention, but rather as exemplifications of some of the preferred embodiments. Those skilled in the art will envision other possible variations, modifications, and applications that are also within the scope of the invention. Accordingly, the scope of the invention should not be limited by what has thus far been described, but by the appended claims and their legal equivalents.

What is claimed is:

1. A method for monitoring a surveillance-target in a surveillance area navigating through the surveillance area's locations, using online video-image-displays of video streams arriving from a multiplicity of video cameras installed in different locations of the surveillance area, said method comprising the steps of:
enabling a user to select an area that includes an image of the surveillance-target shown in the video streams;
automatically identifying the area location by identifying the coordinates enclosing the shape defining the user defined area;
automatically referencing an architectural module that includes an architectural plan of the surveillance area to use the coordinates to identify an access point associated with the user defined area, the access point allowing ingress and egress from a first discrete space in the surveillance area to a second discrete space in the surveillance area;
automatically referencing the architectural module to identify first and second cameras of the multiplicity of video cameras associated with the access point;
automatically displaying the video streams of the first video camera that is associated with the access point and then automatically displaying the video streams of the second video camera that is associated with the access point; and
providing a graphical user interface with activators, which are areas in said graphical user interface that allow the user to define features of display, record video streams data, save settings, select video cameras from the multiplicity of video cameras and define cameras settings of the multiplicity of video cameras,
wherein at least some of said activators further enable the user to shift to a planar view, in which a display window shows a layout of at least some of the multiplicity of video cameras over a map showing at least a part of the surveillance area.

2. The method of claim 1, wherein the video streams are viewed in real time on said video-image-displays.

3. The method of claim 1, wherein the video streams are recorded.

4. The method of claim 1, further comprising enabling the user to operate and control said multiplicity of video cameras.

5. A surveillance system for monitoring a surveillance-target in a surveillance area navigating through the surveillance area's locations, said system comprising:
one or more processors executing instructions on one or more memories to provide:
a plurality of video cameras,
a software application; and
at least one non-transitory computerized medium, wherein said non-transitory computerized medium enables operating said application and, wherein said application is operatively associated with said plurality of video cameras, which are installed in different locations of the surveillance area and produce video streams that are displayed to a user through a video-image-display;
wherein said system allows the user to select an area in said video-image-display, that is filmed by at least one of said plurality of video cameras and monitor said surveillance-target by automatically identifying at least one video camera that is associated with the selected area, linking said selected area in the video-image-display with the associated video camera and displaying a video-image-display of said associated video camera,
wherein said application comprises a graphical user interface for selecting the selected area, wherein said interface comprises:
at least one display window displaying the video streams of at least one of the system's video cameras;
activators, which are areas in said graphical user interface that allow the user to define features of display, record video streams data, save settings, select video cameras and define video cameras settings, wherein at least some of said activators further enable the user to shift to a planar view, in which the display window shows a layout of at least some of the system's video cameras over a map showing at least a part of the surveillance area; and
at least one selecting tool, which enables the user to graphically select the selected area from said display window;
wherein said application automatically identifies a location of the selected area by identifying coordinates enclosing the shape defining the selected area and said application further comprises an architectural module that includes an architectural plan of the surveillance area to use the coordinates to identify an access point associated with the selected area, the access point allowing ingress and egress from a first discrete space in the surveillance area to a second discrete space in the surveillance area; and
wherein the application automatically references the architectural module to identify first and second video cameras of the multiplicity of video cameras associated with the access point; and automatically displays the video streams of the first video camera associated with the access point and then automatically displays the video streams of the second video camera associated with the access point.

6. The surveillance system of claim 5, wherein the application allows online viewing of video streams filmed in real time as said video-image-display.

7. The surveillance system of claim 6, wherein the application allows offline viewing of video streams filmed in a selected past time-interval as said video-image-display.

8. The surveillance system of claim 5, further comprising at least one controller operatively associated with said video cameras of said system, which is a hardware unit enabling to operate and control said video cameras according to operative commands transmitted by said application.

* * * * *